Dec. 28, 1965   H. FUHRMANN   3,226,200
APPARATUS FOR GAS ANALYSIS
Filed May 28, 1962   2 Sheets-Sheet 1

Hans FUHRMANN
Inventor:
BY
ATTORNEY

Dec. 28, 1965  H. FUHRMANN  3,226,200
APPARATUS FOR GAS ANALYSIS
Filed May 28, 1962  2 Sheets-Sheet 2
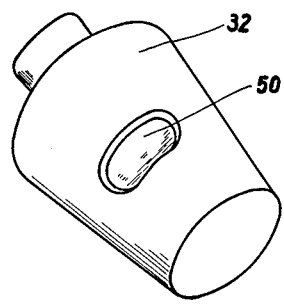
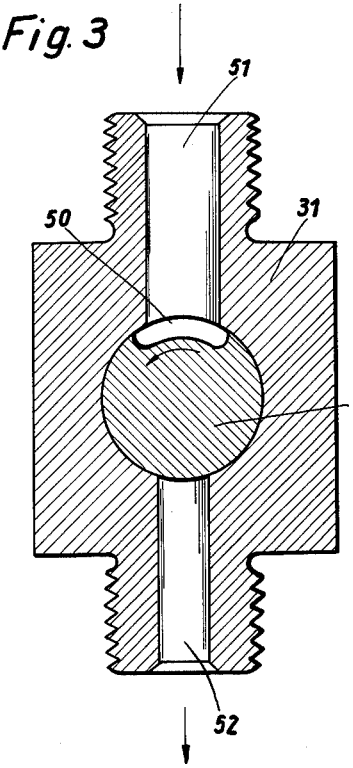
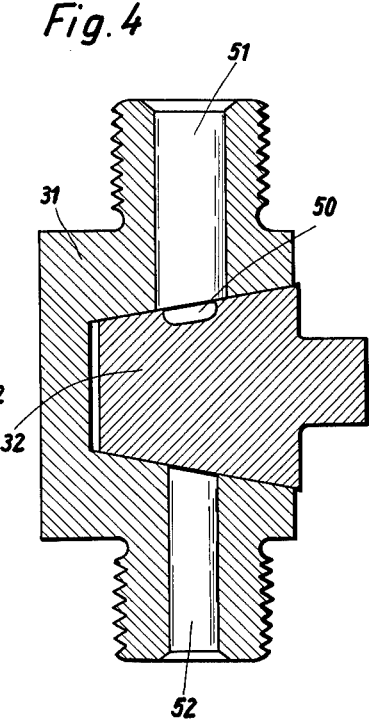
Hans FUHRMANN
Inventor:
BY *Otto John Munz*
ATTORNEY

United States Patent Office 3,226,200
Patented Dec. 28, 1965

3,226,200
APPARATUS FOR GAS ANALYSIS
Hans Fuhrmann, Hamburg-Langenhorn, Germany, assignor to Messrs. Bran & Lübbe, Hamburg, Germany
Filed May 28, 1962, Ser. No. 198,211
Claims priority, application Germany, June 10, 1961,
B 62,859
6 Claims. (Cl. 23—254)

In chemical analysis apparatus for the analysis of liquids, the test liquid and the reaction components are supplied gravitationally through valves, or by means of measuring pumps.

In analysis apparatus for gas analysis, on the other hand, the difficulty arises, that the gas being tested must be at a pressure which is as constant as possible throughout the entire apparatus. It is furthermore necessary to clean continually members for supplying the reaction liquid to keep same free of residual particles of the liquid, since otherwise correct results of measurements are not attainable.

Liquid pressure regulators, so called overpressure bottles, have already been proposed for the purpose of obtaining a pressure which is as uniform as possible. In these regulators there is provided a dip tube which is inserted into the gas-supply pipe line, said dip tube projecting adjustably into an oil bath in a cylindrical body. The pressure occurring in the T-shaped outlet of the gas supply line, and consequently the flow of the carrier gas through the analyser, depends on the original pressure, which, again, arises from the difference in level between the lowest point of the dip-tube and the surface of the oil bath. Adjustment of the depth of immersion of the dip-tube can only be effected in the overpressure bottles hitherto proposed by moving the dip-tube up or down, since the level of the oil in the overpressure bottle is constant.

With other overpressure bottles hitherto proposed and having a constant bath level and the dip-tube immersed at a fixed depth, regulation by means of a needle valve is necessary, and experience has shown the use of such a needle valve to be often disadvantageous on the occurrences of temperature fluctuations.

An object of the present invention is to provide a chemical analysis apparatus with increased accuracy of measurement.

The present invention is a chemical analysis apparatus including a device for fine adjustment of the pressure of the gas to be tested and a measuring rotary valve for the liquid reaction component which valve is connected into or disposed separately from the gas supply line and is adapted to be continuously or intermittently driven.

The fine adjustment device preferably comprises a bellows or other elastic body with a variable volume in continuous communication with an oil-filled overpressure bottle into which projects an open dip-tube connected into said gas supply line.

The bellows or other elastic body may be connected with said overpressure bottle by a pipe line or hose. The bellows or other elastic body is preferably adjustable to a variable volume by means of a handwheel, worm-drive or the like, and the driving means may be so arranged that the volume can be adjustably varied within the finest limits.

The dip-tube, immersed to a constant depth in the overpressure bottle, is preferably provided externally with sawtooth projections.

The measuring rotary valve may consist of a cock with suitable pipe connections and the cock be continuously or intermittently rotated and provided with bores formed as dosage chambers. The dosage chambers may also be in the form of suitably-dimensioned milled recesses in the peripheral surface of the plug.

A plurality of measuring rotary valves may also be used in parallel with one another and have a common drive.

Embodiments of the invention will now be described, by way of example, with reference to the accompanying drawings, in which:

FIG. 2 is a perspective view of a plug for the measuring rotary valve; and

FIGS. 3 and 4 are vertical sections along different planes through the measuring rotary valve.

Figure 1:
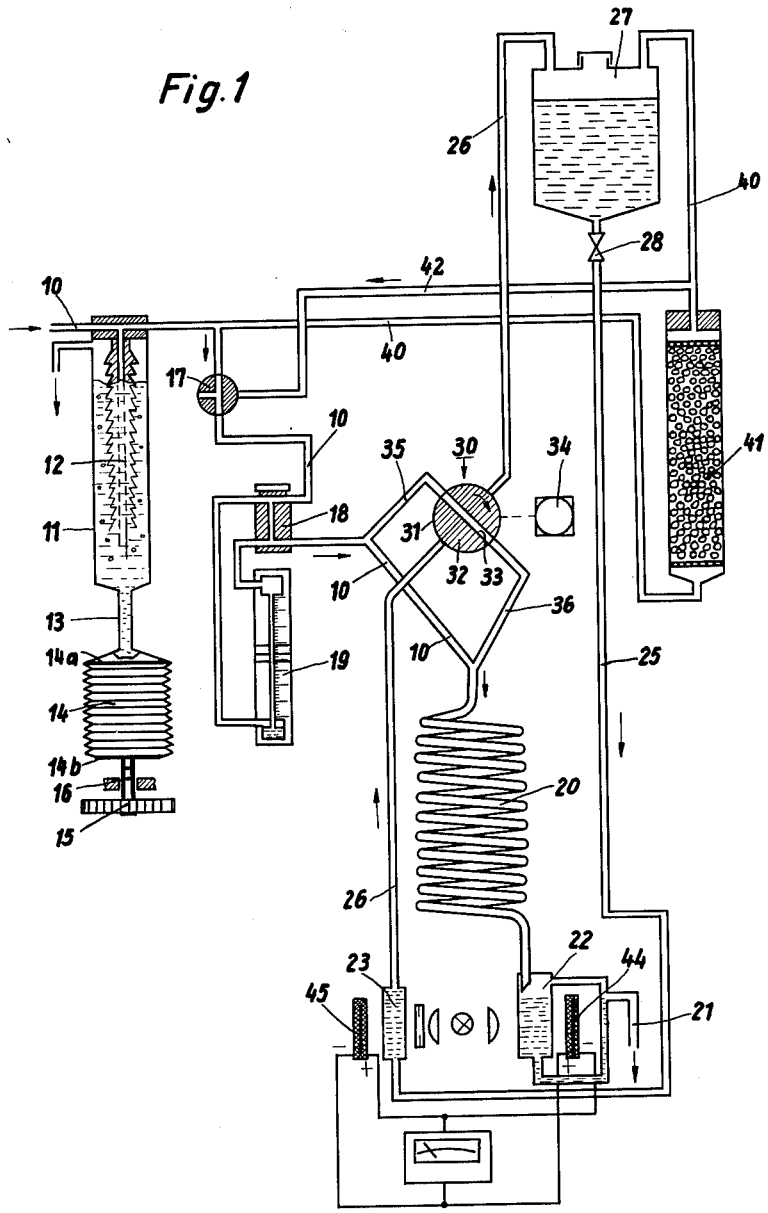
FIG. 1 is a diagrammatic representation of analysis apparatus according to the present invention with a measuring rotary valve and a fine pressure regulator for gas.

Referring now to the drawings, the analysis apparatus according to the invention consists of a supply pipe 10 for the gas to be tested, and into which is connected an oil-filled overpressure bottle 11 for maintaining a constant pressure. The pressure bottle 11 has a fixedly-located dip-tube 12 and is connected by a rigid pipe 13, which may also be of flexible material and is of any required length, with an elastic body 14 which is likewise filled with oil and consists of a bellows extending between two solid ends 14a and 14b. The volume of the elastic body 14 can be varied by means of a handwheel 15 with a knurled rim, and a worm drive 16, and there simultaneously results therefrom a variation in the oil level in the pressure bottle 11. The surface of the dip-tube 12 is preferably formed with sawtooth corrugations.

The supply pipe 10 leads to a capillary tube 18 via a cock 17, and into a spiral tube 20 via a pressure gauge 19, the spiral tube 20 opening into a measuring vessel 22 provided with an overflow 21.

A further measuring vessel 23 is arranged parallel to the measuring vessel 22 and is connected with two pipe lines 25 and 26. The pipe line 25 opens into the bottom of supply receptacle 27. A magnetically-controlled valve is denoted 28.

A measuring rotary valve 30 is inserted into the pipe line 26, and consists of a casing 31 and a cock plug 32 having a bore 33. Turning of the cock plug 32 is effected by means of a pulse-controlled motor 34. The casing 31 of the measuring rotary valve 30 has a supply pipe 35 communicating with the pipe 10, and has joined thereto a pipe 36 which is connected in the same manner as the gas supply pipe 10, with the spiral tube 20.

A further pipe line 40, which leads to the supply receptacle 27, branches from the supply pipe 10. An absorption column 41 is incorporated into the pipe line 40. A branch pipe 42 is provided between the receptacle 27 and the absorption column 41 and the pipe 42 leads to the cock 17, the plug whereof has a T-shaped bore.

In the embodiment illustrated in FIG. 1, photoelectric cells 44 and 45 are located at the measuring vessels 22 and 23.

In accordance with the embodiment illustrated in FIGS. 2 to 4, the measuring rotary valve 30 consists of the casing 31 and the cock 32, and the latter has a measuring chamber 50. A plurality of measuring chambers may, however, also be arranged over the periphery of the cock plug, and these may be mutually parallel or offset.

The casing 31 has supply and discharge sockets 51 and 52, respectively.

The analysis apparatus works in accordance with a process of optical colour comparison by means of the photo-electric cells 44 and 45. The colour tone or tint of the pure absorption liquid is compared with the colour tone or tint of the fully reacted reaction mixture issuing from the spiral tube 20. This affords the advantage that in order to adjust to a constant pressure in the pipes 10, 35 and 36, it is merely necessary to actuate the handwheel 15. Mutual approach of the two end plates 14a and 14b of the elastic body 14, or the mutual separation of said end plates, by means of the worm drive 16, enables adjustment within the finest limits, without it being necessary to alter the depth of immersion of the tube 12. The gas bubbles are most effectively broken up at the sawtooth corrugations on the surface of the dip-tube 12. The adjustment of the volume of the elastic body 14 and thereby of the oil volume in the pressure bottle 11 can also be remotely controlled by forming the connecting pipe 13 as a pipe line or hose.

An exact divided quantity of the reaction liquid is directed through the bore 33 or the chamber forming cutout 50 of the measuring rotary valve 30 into the mixing chamber 20. On this occurring, the stream of gas supplied through the pipe 35 effects a complete scavenging of the chamber 33 each time the cock plug 32 is changed over. Adjustment by means of the handwheel 15 can also be effected for fine control.

The cock plug 32 of the measuring rotary valve 30, which may for example be of a plastic material such as polytetrafluoroethylene, is continuously or intermittently driven by the motor 34. In the embodiment according to FIG. 1 a sufficiently exact dosing results from reciprocal turning of the cock plug 32 if the chamber 33 is turned, alternately, into continuity with the pipe line 26, and into continuity with the pipes 35 and 36. Scavenging by means of the gas is effective on each such turning.

The embodiment according to FIG. 2 to 4 doses with an accuracy hitherto scarcely attainable, even when the cock plug 32 is continuously rotated, and indeed also at high speeds of revolution. The exact measurement of the volume by means of the chamber 50 ensures the accuracy of measurement. The sealing surfaces of the plug 32 ensure that there is no loss of reaction liquid during the turning of the plug. The number of supply and discharge sockets 51 and 52 is the same as the number of measuring chambers 50 provided in the plug 32. A plurality of corresponding measuring rotary valves 30 can be used in parallel. The drive can be taken from the same electric motor. Thus, for example, a fixed amount to be dosed can be supplied in the sample apparatus in two or more portions.

The analysis apparatus with the fine adjustment of the amount of gas by the pressure bottle 11 with elastic body 14 and the measuring rotary valve 30 with the measuring chamber 50 is versatile in use and is of a compact construction. The entire apparatus can, for instance, be cast in a block of plastic material or the like. Only the supply and discharge pipes as well as the handwheel for fine adjustment of the amount of gas and the driving shaft for the measuring rotary valve are then externally accessible.

What I claim is:
1. In an automatic analyzer for measuring traces of gas, a source of constant pressure gas, an absorption vessel, means for continuously supplying constant pressure gas to the absorption vessel, and means for intermittently supplying predetermined volumes of liquid reaction components to the absorption chamber, wherein the source of constant pressure comprises a bottle of constant volume, a conduit extending into the bottle connecting a source of variable pressure with the bottle, and a chamber of variable volume connected to the bottle.

2. A device as in claim 1 wherein the chamber of variable volume comprises a bellows.

3. A device as in claim 2 further comprising means for collapsing and expanding the bellows and means for holding the bellows in constant volume position.

4. A device as in claim 3 wherein the means for collapsing and expanding and the means for holding comprises a worm drive.

5. In an automatic analyzer for measuring traces of gas, a source of constant pressure gas, an absorption vessel, means for continuously supplying constant pressure gas to the absorption vessel, and means for intermittently supplying predetermined volumes of liquid reaction components to the absorption chamber, wherein the means for supplying predetermined volumes of liquid reaction products comprises a rotary valve element having a bore of desired dosage volume, and means for rotating said element, and wherein the means for rotating the valve element comprises a pulse-controlled motor.

6. A source for constant pressure gas comprising a chamber of constant volume, a chamber of variable volume, conduit means connecting the chambers, means for changing the volume of the variable volume chamber and for fixing the volume of said variable volume chamber, and a conduit formed with saw tooth corrugations extending into and opening into the chamber of constant volume and connected to a supply conduit said saw tooth corrugations being located on the outer surface of the respective conduit within the chamber of constant volume, whereby gas bubbles rising from the end of the conduit are broken up.

References Cited by the Examiner

UNITED STATES PATENTS

| | | | |
|---|---|---|---|
| 841,111 | 1/1907 | Bromley | 222—363 |
| 1,111,815 | 9/1914 | Westover | 23—256 |
| 3,049,412 | 8/1962 | Akhtar | 23—232 |

FOREIGN PATENTS 457,910   12/1936   Great Britain.

MORRIS O. WOLK, *Primary Examiner.*